(12) United States Patent
Chang et al.

(10) Patent No.: US 9,555,368 B2
(45) Date of Patent: Jan. 31, 2017

(54) CHEMICALLY-ENHANCED SORBENT ACTIVATION PROCESS AND METHOD OF USING SAME

(76) Inventors: Ramsay Chang, Mountain View, CA (US); Yongqi Lu, Urbana, IL (US); Massoud Rostam-Abadi, Champaign, IL (US)

(*) Notice: Subject to any disclaimer, the term of this patent is extended or adjusted under 35 U.S.C. 154(b) by 52 days.

(21) Appl. No.: 12/851,507

(22) Filed: Aug. 5, 2010

(65) Prior Publication Data

US 2011/0223082 A1 Sep. 15, 2011

Related U.S. Application Data (63) Continuation-in-part of application No. 12/722,497, filed on Mar. 11, 2010, now Pat. No. 8,999,278.

(51) Int. Cl.

| | | |
|---|---|---|
| *B01D 53/64* | (2006.01) | |
| *B01D 53/38* | (2006.01) | |
| *B01D 53/02* | (2006.01) | |
| *B01J 20/20* | (2006.01) | |
| *B01J 20/30* | (2006.01) | |
| *B01J 20/02* | (2006.01) | |
| *B01J 20/04* | (2006.01) | |
| *B01J 20/32* | (2006.01) | |

(52) U.S. Cl.
CPC .............. *B01D 53/64* (2013.01); *B01D 53/025* (2013.01); *B01D 53/38* (2013.01); *B01J 20/027* (2013.01); *B01J 20/0229* (2013.01); *B01J 20/046* (2013.01); *B01J 20/20* (2013.01); *B01J 20/3085* (2013.01); *B01J 20/3204* (2013.01); *B01J 20/3236* (2013.01); *B01D 2251/108* (2013.01); *B01D 2251/404* (2013.01); *B01D 2253/102* (2013.01); *B01D 2253/25* (2013.01); *B01D 2255/00* (2013.01); *B01D 2257/602* (2013.01); *B01D 2258/0283* (2013.01); *B01D 2259/10* (2013.01); *B01J 2220/56* (2013.01)

(58) Field of Classification Search
CPC ...... B01D 53/38; B01D 53/64; B01D 2259/10
See application file for complete search history.

(56) References Cited

U.S. PATENT DOCUMENTS

| | | |
|---|---|---|
| 3,662,523 A | 5/1972 | Revoir et al. |
| 4,540,553 A | 9/1985 | Hagiwara et al. |
| 5,158,580 A | 10/1992 | Chang |
| 5,435,980 A * | 7/1995 | Felsvang et al. ............. 423/210 |
| 5,505,766 A | 4/1996 | Chang |
| 5,827,352 A | 10/1998 | Altman et al. |
| 6,200,543 B1 | 3/2001 | Allebach et al. |
| 6,391,266 B1 | 5/2002 | Lavely, Jr. |
| 6,558,454 B1 | 5/2003 | Chang et al. |
| 6,818,043 B1 | 11/2004 | Chang et al. |
| 6,878,358 B2 | 4/2005 | Vosteen et al. |
| 6,932,956 B2 | 8/2005 | Jia |
| 7,141,091 B2 | 11/2006 | Chang |
| 7,249,564 B2 | 7/2007 | Lissianski et al. |
| 7,282,189 B2 | 10/2007 | Zauderer |
| 7,435,286 B2 * | 10/2008 | Olson et al. ..................... 95/142 |
| 7,704,921 B2 * | 4/2010 | Bool et al. ..................... 502/417 |
| 8,017,550 B2 * | 9/2011 | Chao et al. ..................... 502/417 |
| 2002/0061271 A1 | 5/2002 | Zauderer |
| 2004/0003716 A1 | 1/2004 | Nelson, Jr. |
| 2006/0204430 A1 | 9/2006 | Bool, III et al. |
| 2010/0004119 A1 | 1/2010 | Gadkaree |
| 2011/0223088 A1 | 9/2011 | Chang et al. |

* cited by examiner

*Primary Examiner* — Stuart Hendrickson
(74) *Attorney, Agent, or Firm* — Owens Tarabichi LLP (57) ABSTRACT

The invention in its various embodiments is directed to methods and equipment for generating an activated sorbent from a sorbent precursor with the addition of certain chemicals that enhance the effectiveness of the activated sorbent. The invention in its various embodiments is also directed to the methods and equipment for generating some of the chemicals that are added to the raw carbonaceous material or activated sorbent to enhance its effectiveness. The invention in its various embodiments is also directed to methods and equipment for generating certain chemicals that can be added to a gas stream to convert a given gaseous pollutant to a form that is more easily removed from the gas stream.

18 Claims, 5 Drawing Sheets

CHEMICALLY-ENHANCED SORBENT ACTIVATION PROCESS AND METHOD OF USING SAME

CROSS-REFERENCE TO RELATED APPLICATION

This application is a continuation-in-part of prior U.S. patent application Ser. No. 12/722,497, now U.S. Pat. No. 8,999,278 filed Mar. 11, 2010, which is incorporated by reference herein in its entirety.

BACKGROUND

Background of the Invention

This invention relates generally to the production of an activated sorbent for use in the removal of gaseous pollutants from a gas stream. In one embodiment, this invention relates to methods and apparatuses for the on-site production of an activated sorbent, such as activated carbon, in combination with the addition of certain chemicals that enhance the activity or effectiveness of the activated sorbent to produce a chemically-enhanced activated sorbent. Further, this invention relates to methods and apparatuses for the use of the chemically-enhanced activated sorbent in the removal of gaseous pollutants from a gas stream. In another embodiment, this invention relates to methods and apparatuses for the addition of certain chemicals that convert certain gaseous pollutants in a gas stream to a form that is more easily removed from the gas stream, for example, by a sorbent, including a chemically-enhanced activated sorbent.

Description of Related Art

Controlling emissions of certain gaseous pollutants, such acid gases and air toxics, in flue gases generated from combustion devices, such as coal-fired power plants, is an important concern. In such flue gases, certain air toxics and other species can be distributed in both the vapor phase and the solid phase, thereby requiring the removal of both solid matter, such as particulate matter, as well as vapor phase species. Further, certain air toxics (e.g., mercury), certain acid gases (e.g., $SO_3$, HCl), and other air toxics (e.g., arsenic, selenium, nickel, lead, organics, etc.) that are present in the vapor phase of such gases are typically found in very low concentrations making removal difficult.

Sorbents are sometimes used to remove certain pollutants from gas streams. For example, sorbents may be injected into a gas stream and collected downstream after adsorbing a targeted vapor phase contaminant. Alternatively, a packed bed, an entrained bed, or fluidized bed may use a sorbent to adsorb a given vapor phase pollutant from a gas stream.

Calcium-based sorbents such as limestone, dolomite, lime, hydrated lime, calcium acetate, and calcium magnesium acetate are used, for example, in the removal of sulfur-based vaporous pollutants, such as $SO_2$ and $SO_3$, from coal-fired power plant flue gases. These sorbents can also be effective in removing other acid gases, such as HCl and $H_2S$, as well as vaporous air toxic species including metal compounds such as selenium, arsenic, nickel, lead, and others found in trace amounts in coal-fired power plant flue gases. However, the process by which hydrated lime or lime, in particular, is produced is energy intensive, making these sorbents relatively expensive.

Regarding the removal of mercury, activated carbon is a sorbent used for sorption of mercury species from coal combustion flue gases and other industrial gas streams. The results from pilot and full-scale field demonstration tests have revealed that at a carbon loading of less than 5 lb/MMft$^3$, mercury removal greater than 90% is achievable for flue gases generated from burning low-sulfur coals. However, mercury removal efficiency for flue gases generated from burning high-sulfur coals, which commonly contain greater than 10 ppm $SO_3$, a level significantly higher than that in flue gases generated from lower sulfur coals, have been reported to be less than 50% at comparable activated carbon loadings.

In view of the foregoing, there is a need for an improved, low-cost method for generating a sorbent for use in removing certain gaseous pollutants from gas streams. Further, there is a need for generating a sorbent that has sufficient activity or effectiveness in adsorbing such gaseous pollutants.

SUMMARY OF THE INVENTION

Generally, the invention in its various embodiments is directed to methods and equipment for removing a gaseous pollutant from a gas stream. More particularly, the invention in its various embodiments is directed to methods and equipment for generating an activated sorbent from a sorbent precursor with the addition of certain chemicals that enhance the effectiveness of the activated sorbent. The activated sorbent having enhanced effectiveness can then be added to a gas stream to adsorb or remove one or more gaseous pollutants. The invention in its various embodiments is also directed to the methods and equipment for generating some of the chemicals that are added to the raw carbonaceous material or activated sorbent to enhance its effectiveness. The invention in its various embodiments is also directed to methods and equipment for generating certain chemicals that can be added to a gas stream to convert a given gaseous pollutant to a form that is more easily removed from the gas stream, for example, by using an activated sorbent including commercially available sorbents, sorbents produced on-site, and sorbents produced according to the methods described herein, such as activated sorbents produced with the addition of certain chemicals that enhance the activated sorbent's effectiveness.

In one embodiment, the invention provides a method for generating a sorbent, comprising activating a sorbent precursor in the presence of a chemical to produce a chemically-enhanced activated sorbent that provides increased adsorption of a gaseous pollutant than the same activated sorbent produced in the absence of the chemical.

In another embodiment, the invention provides a method for removing a gaseous pollutant, comprising activating a sorbent precursor in the presence of a chemical to produce a chemically-enhanced activated sorbent that provides increased adsorption of a gaseous pollutant than the same activated sorbent produced in the absence of the chemical; adding the chemically-enhanced activated sorbent to a gas stream comprising at least one gaseous pollutant; adsorbing the at least one gaseous pollutant with the chemically-enhanced activated sorbent; and removing the activated sorbent and the adsorbed gaseous pollutant from the gas stream.

In another embodiment, the invention provides a method for removing a gaseous pollutant, comprising adding a chemical to a gas stream comprising at least one gaseous pollutant; converting the at least one gaseous pollutant to a converted form that is more easily removed from the gas stream compared to the at least one gaseous pollutant's original form; adsorbing the converted form of the at least one gaseous pollutant with a sorbent; and removing the sorbent and the converted form of at least one gaseous pollutant from the gas stream.

DETAILED DESCRIPTION OF THE INVENTION

Generally, the following description is directed to methods and equipment for removing a gaseous pollutant from a gas stream. More particularly, the following description is directed to methods and equipment for generating an activated sorbent from a sorbent precursor with the addition of certain chemicals that enhance the effectiveness of the activated sorbent. The activated sorbent having enhanced effectiveness can then be added to a gas stream to adsorb or remove one or more gaseous pollutants. For example, in one embodiment, methods and equipment are described for the generation of activated carbon from a raw carbonaceous starting material with the addition of certain chemicals, such as bromine or other transition and noble metals, that enhance the effectiveness of the activated carbon. This activated carbon can be added, for example, to a flue gas stream from a coal-fired boiler for the adsorption or removal of vaporous mercury from the flue gas stream, where this particular activated carbon will more effectively adsorb mercury in the flue gas stream than activated carbon produced without the addition of certain chemicals. The following description is also directed to the methods and equipment for generating some of the chemicals that are added to the raw carbonaceous material or activated sorbent to enhance its effectiveness.

The following description is also directed to methods and equipment for generating certain chemicals that can be added to a gas stream to convert a given gaseous pollutant to a form that is more easily removed from the gas stream, for example, by using an activated sorbent. For example, in one embodiment, the following description is directed to methods and equipment for generating certain ions and gases that can be added to a gas stream to assist in the removal of certain gaseous pollutants. These ions and gases react with one or more vapor phase contaminants to alter their chemical composition to a form that allows them to be more easily removed from the gas stream. For example, a high temperature reactor can be used to decompose bromine compounds into bromine ions and gases, such as bromine gas, elemental bromine, or hydrogen bromide. These bromine ions and gases can be added, for example, to a flue gas stream from a coal-fired boiler that contains elemental mercury to oxidize the elemental mercury to an oxidized form of mercury. Since such ions and gases may be corrosive inside a boiler, in some embodiments, these ions and gases can be advantageously added to the flue gas stream downstream of the boiler. The oxidized form of mercury can then be more easily removed from the gas stream, for example, through absorption in a wet $SO_x$ scrubber or with the use of an activated sorbent, including, for example, commercially available sorbents, sorbents produced on-site, and sorbents produced according to the methods described herein, such as activated sorbents produced with the addition of certain chemicals that enhance the activated sorbent's effectiveness.

The foregoing methods and equipment are described in more detail below along with other exemplary embodiments of the invention. These embodiments are described in conjunction with the accompanying drawings, which are not necessarily drawn to scale and in which identical reference numerals throughout the figures identify common elements and dotted lines illustrate optional features. The following description is not intended to be limiting, as it will be apparent to one of skill in the art that certain modifications may be made to the various exemplary embodiments. Accordingly, such modifications are intended to be within the scope of the present invention. Further, it should be appreciated that the use of the term "sorbent" and "activated sorbent" may be used interchangeably, such that the generation of an activated sorbent from a sorbent precursor, such as a raw carbonaceous material, may be referred to simply as a "sorbent."

Figure 1:
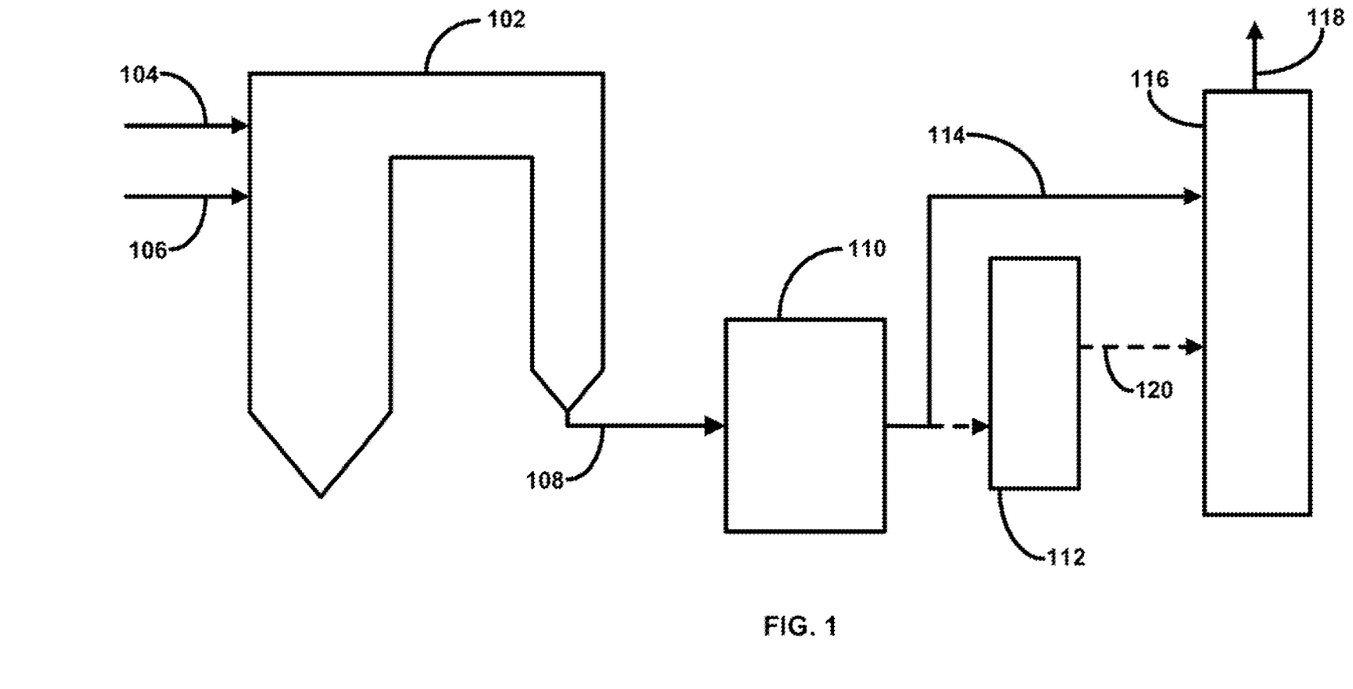
FIG. 1 illustrates a combustion device and a pollution removal system in which various embodiments of the present invention may be utilized.

FIG. 1 illustrates a process flow diagram for a combustion device and a pollution removal system in which various embodiments of the present invention may be utilized. The combustion device 102, such as a fossil-fuel-fired boiler, uses air 104 to combust fuel 106, such as a fossil fuel, for example, coal, to produce heat for use. The combustion of the fuel 106 produces an exhaust gas or flue gas that exits the combustion device 102 through a combustion device outlet duct 108. The flue gas produced within the combustion device 102 is generally comprised of air; gaseous products of combustion, such as water vapor, carbon dioxide, oxides of nitrogen and sulfur, halides, organic compounds, mercury, selenium, and other trace metal vapors; and particulate matter or fly ash. The pollution removal system comprises a particulate collection device 110, such as a wet or dry electrostatic precipitator or a baghouse, and optionally, a scrubber 112, such as a wet scrubber. The particulate collection device 110 is connected to the combustion device outlet duct 108 and removes particulate matter from the flue gas. The flue gas then passes from the particulate collection device 110 through a particulate collection device outlet duct 114 to a stack 116 where the flue gas 118 is discharged to the atmosphere. Alternatively, the flue gas passes from the particulate collection device 110 to the scrubber 112 (as shown by the dashed line) and from the scrubber 112 through a scrubber outlet duct 120 and to the stack 116 where it is discharged to the atmosphere. It should be appreciated that this process is only exemplary, and the methods and apparatuses of the present invention generally may be used in connection with any gas stream in any process.

Figure 2:
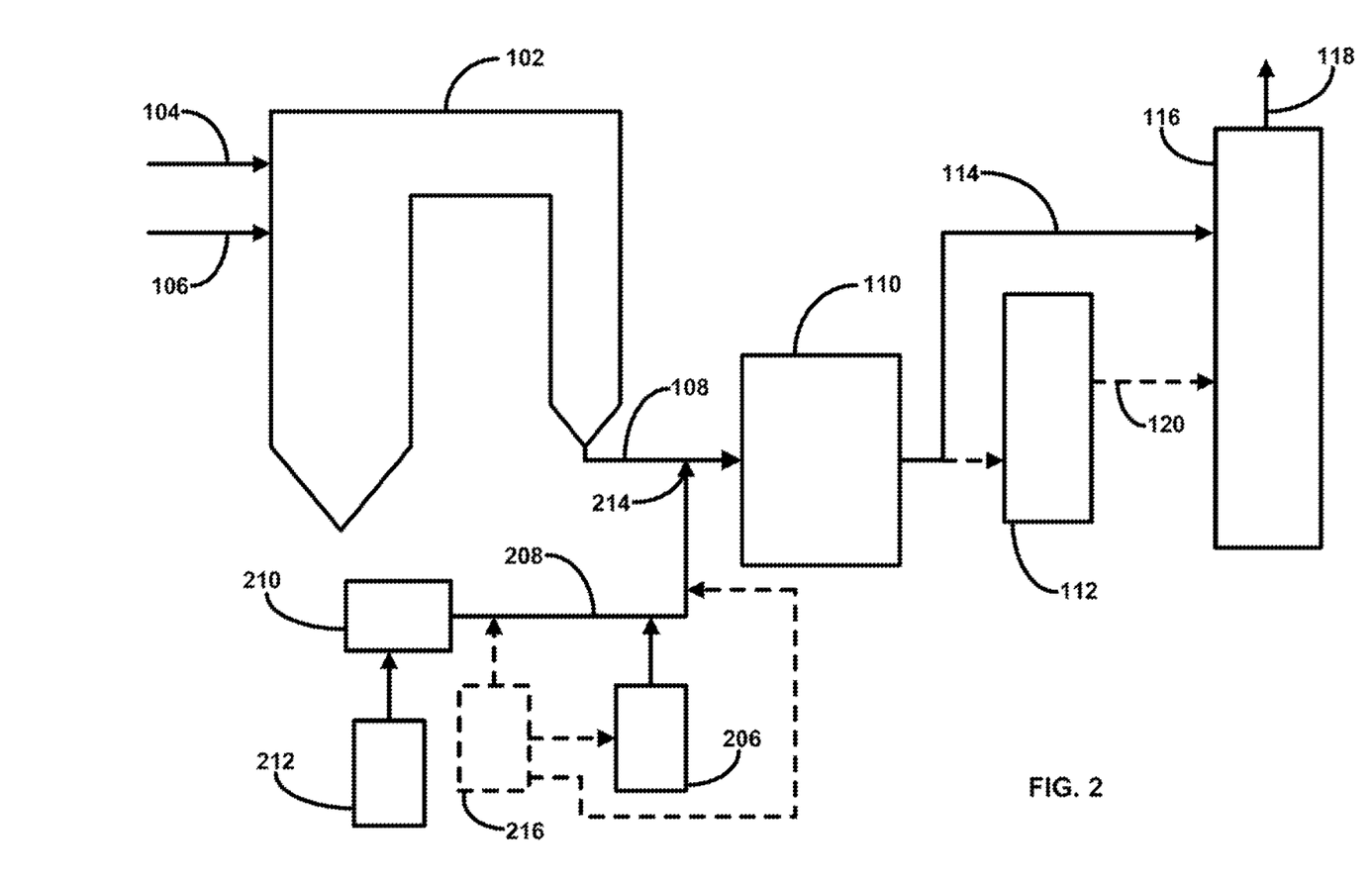
FIG. 2 illustrates a process flow diagram for generating a sorbent having an enhanced effectiveness and adding it to a flue gas stream according to one embodiment of the invention.

FIG. 2 illustrates a process flow diagram for generating an activated sorbent having an enhanced effectiveness and adding it to a flue gas stream according to one embodiment of the invention. In particular, FIG. 2 illustrates an embodiment in which a sorbent precursor is added to a gas stream to produce an activated sorbent. In addition, one or more chemicals are added to this gas stream to enhance the effectiveness of the activated sorbent, which is then added to a flue gas stream containing a gaseous pollutant, such as the flue gas stream illustrated in FIG. 1, to remove the gaseous pollutant from the flue gas stream.

An addition device 206 is used for adding a sorbent precursor, such as a raw carbonaceous material, to a gas stream 208, which may be referred to as an activating gas stream, provided by a gas stream source 210. The addition device 206 can be any mechanical or pneumatic device that feeds the raw carbonaceous material in either dry or slurry form.

It should be appreciated that there may be more than one additive device for adding sorbent precursor to the activating gas stream 208. Further, it should be appreciated that the gas stream residence time for any given addition location or point where the sorbent precursor is added to the gas stream 208, which is the amount of residence time of the flue gas from the addition location to the additional location where the then activated sorbent is added to the flue gas stream, will affect the degree of activation of the sorbent precursor. In some embodiments, a gas stream residence time of approximately about 0.1 to about 30 seconds should be suitable to activate raw carbonaceous material, and in other embodiments, a gas stream residence time between about 0.1 and about 5 seconds is suitable.

In this embodiment, the raw carbonaceous material may be any carbonaceous material such as coal, wood, petroleum coke, biomass materials, sewage sludge, organic wastes or other carbonaceous material and can also be a liquid or gas derived from organic liquids such as residual or distillate oils, or organic gases containing hydrocarbons such as methane, ethane, propane, butane, and ethylene or alcohols such as methanol and ethanol. Preferably organic gases contain molecules that have up to about eight carbon atoms.

The gas stream source 210 may be any source or device used to provide a gas stream suitable to activate a sorbent precursor, such as raw carbonaceous material, and carry it to the flue gas generated by the combustion device 102. The gas stream source 210 may be a separate combustor that generates a gas stream, or it may be a waste heat stream that is generated in a separate process or separate location from the combustion device 102. The gas stream source 210 may also be a gas stream formed by the combination of different gases, for example, by the combination of cylinder gases, that allows for the generation of a particular gas composition and temperature suitable for activating the sorbent precursor, such as raw carbonaceous material.

In this embodiment, it should be appreciated that it is the temperature of the activating gas stream 208 from the gas stream source 210 that must be sufficient to activate the sorbent precursor to produce an activated sorbent. Accordingly, it should be appreciated that the temperature of this activating gas stream 208 may be adjusted to provide the desired temperature or the desired amount of activation. In one embodiment in which the sorbent precursor is a raw carbonaceous material, the activating gas stream 208 has an activation temperature between about 100° C. and about 1400° C.

In particular, if the sorbent precursor is a liquid or gas phase raw carbonaceous material, the activation temperature in some embodiments is between about 500° C. and about 1200° C. so that cracking, pyrolysis, partial oxidation, or gasification of the liquid or gas occurs to produce fine carbonaceous particles. Upon activation, if the raw carbonaceous material is a liquid or gas, cracking, pyrolysis, partial oxidation, or gasification occurs to form fine carbonaceous particles, for example, soot. The particle size of the raw carbonaceous material, or the fine carbonaceous particles formed from the liquid or gas, should be fine enough to suspend the individual particles in the flue gas stream. In some embodiments, the particles are less than about 100 μM in size, and in other embodiments, the particles are less than about 10 μm in size. The raw carbonaceous material can be added in either a dry powdery form or as a wet slurry form, such that the heat of the flue gas will evaporate at least some of the suspending fluid, leaving the raw carbonaceous material suspended in the flue gas stream.

A chemical addition device 212 is used to add one or more chemicals to the gas stream source 210. The chemical addition device 212 may be any device known in the art suitable for adding a given chemical compound to the gas stream source 210. Alternatively, or in addition to the chemical addition device 212 that adds certain chemicals to the gas stream source 210, another chemical addition device 216, as shown by the dotted-lines, may be used to add the desired chemical(s) directly to the gas stream 208 produced by the gas stream source 210 downstream of the gas stream source 210 but upstream of the addition device 206 that adds the raw carbonaceous material to the gas stream 208 produced by the gas stream source 210. Alternatively, or in addition, this chemical addition device 216 may add the desired chemical(s) to the addition device 206 that adds the sorbent precursor to the gas stream 208 produced by the gas stream source 210, thereby adding the chemical concurrently with the sorbent precursor to the gas stream 208 produced by the gas stream source 210. In this case, the sorbent precursor and the chemical being added can be mixed using various methods depending upon the specific sorbent precursor and chemical used. Alternatively, or in addition to any of the other addition locations, this chemical addition device 216 may add the desired chemical(s) to the activating gas stream 208 downstream of the point where the sorbent precursor is added by addition device 206.

The chemicals added using the chemical addition device 212, 216 are used to enhance the activity or effectiveness of the activated sorbent derived from the sorbent precursor. Accordingly, this chemical may be any one or more chemicals or chemical compounds that will enhance the activity or effectiveness of the activated sorbent such that the removal of a given vapor phase contaminant under the same conditions is increased compared to the same sorbent prepared without such chemical.

In some embodiments, the chemical(s) added combine with the activated sorbent and upon interaction with a given gaseous pollutant may catalyze a particular reaction with the gaseous pollutant making it more easily adsorbed by the sorbent. For example, noble and transition metals may be used as the chemical(s) that enhance the effectiveness of the sorbent by catalyzing the oxidation of mercury, a gaseous pollutant, thereby making the oxidized mercury more easily adsorbed by the sorbent. Such noble and transition metals may be added as metals or metal-based compounds using the chemical addition device 212, 216. In other embodiments, other chemicals may catalyze or impact the sorbent activation reaction itself (e.g., activation rate, porosity/pore size, BET, etc.) and thus enhance the activity of a sorbent.

In one embodiment, the chemical added is calcium bromide to enhance the activity or effectiveness of activated carbon. The calcium bromide can be added using any of the method and chemical addition devices 212, 216 described above. For example, the calcium bromide may be injected as a powder or solution into either the gas stream source 210 or the activating gas stream 208. Alternatively the calcium bromide may be mixed with the sorbent precursor or wet impregnation may be used to add the calcium bromide to the sorbent precursor prior to adding this mixture to the activating gas stream 208.

It should be appreciated that by adding the calcium bromide as the chemical to a given gas stream as described above when using a raw carbonaceous material as the sorbent precursor, the raw carbonaceous material can be both activated and chemically-enhanced through bromination to a form of brominated activated carbon. Moreover, by adding the calcium bromide as described above, the raw carbonaceous material can be converted into the brominated activated carbon basically in one process step. In other words, it is not necessary to first produce the activated carbon using separate process equipment and to then separately brominate the activated carbon. In the processes described above, the activation and bromination occurs within the same process equipment, in-situ, and on-site where it is to be used. In some embodiments, the brominated activated carbon can be used to remove mercury from the gas or flue gas stream.

In other embodiments, the chemical added includes one or more of iron and various transition and noble metals (e.g., nickel, cobalt, copper, manganese, chromium, platinum, palladium, and ruthenium) and related compounds of such iron, transition, or noble metals (oxides, salts, chelates, complexes, and other alike compounds) to enhance the activity or effectiveness of an activated sorbent such as activated carbon. When utilizing these metals or related compounds, it should be appreciated that it is desirable to maximize their exposed surface area to obtain the maximum effect. Accordingly, the metal or metal-based compound, or combinations thereof, are dispersed into the given activating gas stream 208, as described above, as relatively fine to very fine particles to allow the particles to enter the pores of the activated carbon. In some embodiments, the metals are added to the activating gas stream 208 as a metal compound solution, which can be added separately or concurrently with the sorbent precursor. In other embodiments, a metal compound solution is used to impregnate a sorbent precursor, and the mixture is then added to the activating gas stream 208 for activation. In this case, the heat from the activating gas stream 208 will evaporate the water and decompose the metal salt or other compounds to allow the metal to interact and disperse into the activated carbon. The required temperature of the activating gas stream 208 into which the metal salt solution is added will vary depending upon the composition of the metal compound solution. However, the addition point where the metal compound solution is added to the activating gas stream 208 can be selected based upon the temperature profile of the activating gas stream 208 to ensure that the metal compound solution is heated to the appropriate temperature to evaporate the water and decompose the metal salt. In some embodiments, this temperature should be between about 100° C. and about 1400° C.

In some embodiments, iron or iron-based compounds are used as the chemical to provide a high metal surface area of iron in the activated carbon that can potentially be very effective for selenium adsorption, as iron has been shown to be a good getter of selenium. Further, activated carbon impregnated with iron can provide an activated carbon with magnetic properties. This may make the iron-impregnated activated carbon easy to separate from other particles, such as fly ash or scrubber solids, by utilizing the magnetic property to achieve separation. The iron can be added in any of the ways described above for other chemicals.

In other embodiments, the chemical added can be any halogen element or halogen-based compound, including, for example, chlorides, iodides, and fluorides. These halogens can be added in any of the ways described above for other chemicals as halogens or halogen-based compounds and may be added as their respective salts. When using such halogens with a raw carbonaceous material as the sorbent precursor, it should be appreciated that in some embodiments such halogens will attach to the activated carbon being produced to make it more reactive to mercury thereby increasing the adsorption of the mercury.

In still other embodiments, the chemical added can be an alkali. For example, a sodium-, calcium-, or magnesium-based alkali compound may be used.

Returning to FIG. 2, after addition of the sorbent precursor and the desired chemical to the activating gas stream 208, the sorbent precursor is activated in-situ by the heat of the activating gas stream 208, and its activity is enhanced by the presence of, or reaction with, the chemical(s) added by the chemical addition device 212 (or by another chemical addition device 216 or by both devices 212, 216) to produce a chemically-enhanced activated sorbent or a sorbent having enhanced activity.

The chemically-enhanced activated sorbent is then added to the flue gas stream at an addition location 214 anywhere along the combustion device outlet duct 108. Accordingly, this addition location 214 is downstream of the combustion device 102 and upstream of the particulate collection device 110. Once in the flue gas stream, the chemically-enhanced activated sorbent is available to adsorb gaseous pollutants in the flue gas stream. The chemically-enhanced activated sorbent along with any adsorbed gaseous pollutants is then collected in the particulate collection device 110 and removed from the flue gas stream.

It should be appreciated that there may be more than one addition location where the chemically-enhanced activated sorbent is added to the flue gas stream; however, since the particulate collection device 110 is used to collect the chemically-enhanced activated sorbent along with any adsorbed gaseous pollutants and remove it from the flue gas, the addition locations must be positioned upstream of the particulate collection device 110. But, these addition locations may be anywhere along the combustion device outlet duct 108.

It should be appreciated that the amount of adsorption of the various gaseous pollutants will also depend upon the gas stream residence time between the addition point of the chemically-enhanced activated sorbent and the point of collection of the activated sorbent in the particulate collection device 110. It should be appreciated that the amount of removal of the gaseous pollutants will also depend upon the amount of contact between the gas phase and the gaseous pollutants and the chemically-enhanced activated sorbent. The degree of removal will also depend upon the composition of the chemically-enhanced activated sorbent and the composition of the gaseous pollutants.

The equipment described above in connection with FIG. 2 can also be used to implement various other embodiments of the invention. In these embodiments, certain chemicals are added to the flue gas stream to react with a given gaseous pollutant and convert it to a form that is more easily removed from the gas stream compared to its original form, for example, by using an activated sorbent. With reference to FIG. 2, these chemicals can be added to the flue gas stream through addition to the activating gas stream 208 by the chemical addition device 212, or additional chemical addition devices 216. Alternatively, or in addition, these chemicals can be added directly to the flue gas stream at an addition location (not shown) in the combustion device outlet duct 108.

Once added to the flue gas stream, the chemicals will react with a given gaseous pollutant to convert it to a form that is more easily removed from the flue gas stream. One method by which the converted form of the gaseous pollutant can be removed from the gas stream is through the use of an activated sorbent, including, for example, commercially available sorbents, sorbents produced on-site, and sorbents produced according to the methods described herein, such as activated sorbents produced with the addition of certain chemicals that enhance the activated sorbent's effectiveness as described above. These sorbents can be added to the combustion device outlet duct 108, and in some embodiments are added downstream of the location where the chemicals are added to the flue gas stream. In other embodiments, the chemicals and the activated sorbent may be added to the flue gas stream concurrently with the chemicals. For example, the chemicals and an activated sorbent could be added concurrently to the flue gas stream utilizing the equipment shown in FIG. 2. It should be appreciated that the converted forms of certain gaseous pollutants may also be more easily removed using other equipment as well, such as the particulate collection device 110 or the scrubber 112.

For example, in one embodiment, the chemicals added to the flue gas stream include certain ions and gases can be generated and added to assist in the removal of certain gaseous pollutants. These ions and gases react with one or more gaseous pollutants to alter its chemical composition to a form that allows it to be more easily removed from the gas stream. For example, a high temperature reactor can be used to decompose bromine compounds, such as sodium and calcium bromide, into chemically reactive bromine ions and gases, such as bromine gas, elemental bromine, or hydrogen bromide. The required temperature of the gas stream into which the bromine compound is added should be high enough to achieve decomposition and in some embodiments will be in the range of about 300° C. to about 1700° C. These bromine ions and gases can be added, for example, to a flue gas stream from a coal-fired boiler that contains elemental mercury to oxidize the elemental mercury to an oxidized form of mercury. Since such ions and gases may be corrosive inside a boiler, in some embodiments, these ions and gases can be advantageously added to the flue gas stream downstream of the boiler. The oxidized form of mercury can then be more easily removed from the gas stream, for example, with the use of an activated sorbent, including, for example, commercially available sorbents, sorbents produced on-site, and sorbents produced according to the methods described herein, such as activated sorbents produced with the addition of certain chemicals that enhance the activated sorbent's effectiveness as described above. Such oxidized form of mercury could also be more easily removed from the flue gas stream through absorption in a wet $SO_x$ scrubber.

In other embodiments, the chemical added can be any halogen element or halogen-based compound, including, for example, chlorides, iodides, and fluorides. These halogens can be added in any of the ways described above for other chemicals as halogens or halogen-based compounds and may be added as their respective salts. In some embodiments, these halogens work in the same way as the bromides to oxidize elemental mercury to an oxidized form of mercury that can be more readily removed from the gas stream via activated carbon or by absorption in a wet $SO_x$ scrubber.

It should be appreciated that the chemicals added to the flue gas stream to convert a given gaseous pollutant to a form that is more easily removed, may be the same chemicals used to enhance the activation of a given activated sorbent as described above. In this case, the equipment shown in FIG. 2 may be used to produce a chemically-enhanced activated sorbent as well as to add additional chemicals to the flue gas stream to react with given gaseous pollutants, which may, in turn, be removed or adsorbed by the chemically-enhanced activated sorbent. In other words, the amount of chemicals added by the chemical addition device 212, 216 would be greater than that required to only enhance the activity of the activated sorbent, such that the additional chemical would be available to react with a given gaseous pollutant once added to the flue gas stream via the activating gas stream 208. As noted above, the chemicals could alternatively, or in addition, be added directly to the flue gas stream at a separate location along the combustion device outlet duct 108; however, it should be appreciated that in some embodiments, this separate addition location is upstream of the addition location where the chemically-enhanced activated sorbent is added to the combustion device outlet duct 108. One example of such an embodiment is the use of bromine compounds. As noted above, bromine can be used to brominate an activated carbon and thereby chemically enhance its activity as a sorbent, and bromine compounds can be added to a gas stream that contains elemental mercury to oxidize the elemental mercury to an oxidized form of mercury that is more easily removed, for example, by the chemically-enhanced activated carbon.

In other embodiments, the chemicals added may be different than those used to produce a chemically-enhanced activated sorbent. With reference to FIG. 2, in this case, the chemicals used to produce a chemically-enhanced activated sorbent can be added as described above, and the chemicals being added to the flue gas stream to react with a given gaseous pollutant may be added concurrently with the chemicals used to produce a chemically-enhanced activated sorbent or separately. In the latter case, the chemicals could still be added to the activating gas stream 208 or separately and directly added to the combustion device outlet duct 108.

It should be appreciated that in the embodiment where an activated sorbent is added to the flue gas stream or the combustion device outlet duct 108 separately from the chemicals being added to the flue gas stream, that the amount of chemicals added can be increased beyond the amount needed to react with a given gaseous pollutant. This additional amount of the chemicals can then be used to chemically enhance the activated sorbent present in the flue gas stream. Of course, in this case, the chemicals added to the flue gas stream would need to be the same chemicals that could be used to chemically enhance the activated sorbent. In addition, the location where the chemicals and the activated sorbent are added to the flue gas stream would have to be positioned to provide sufficient time and temperature to chemically enhance the activated sorbent.

Figure 3:
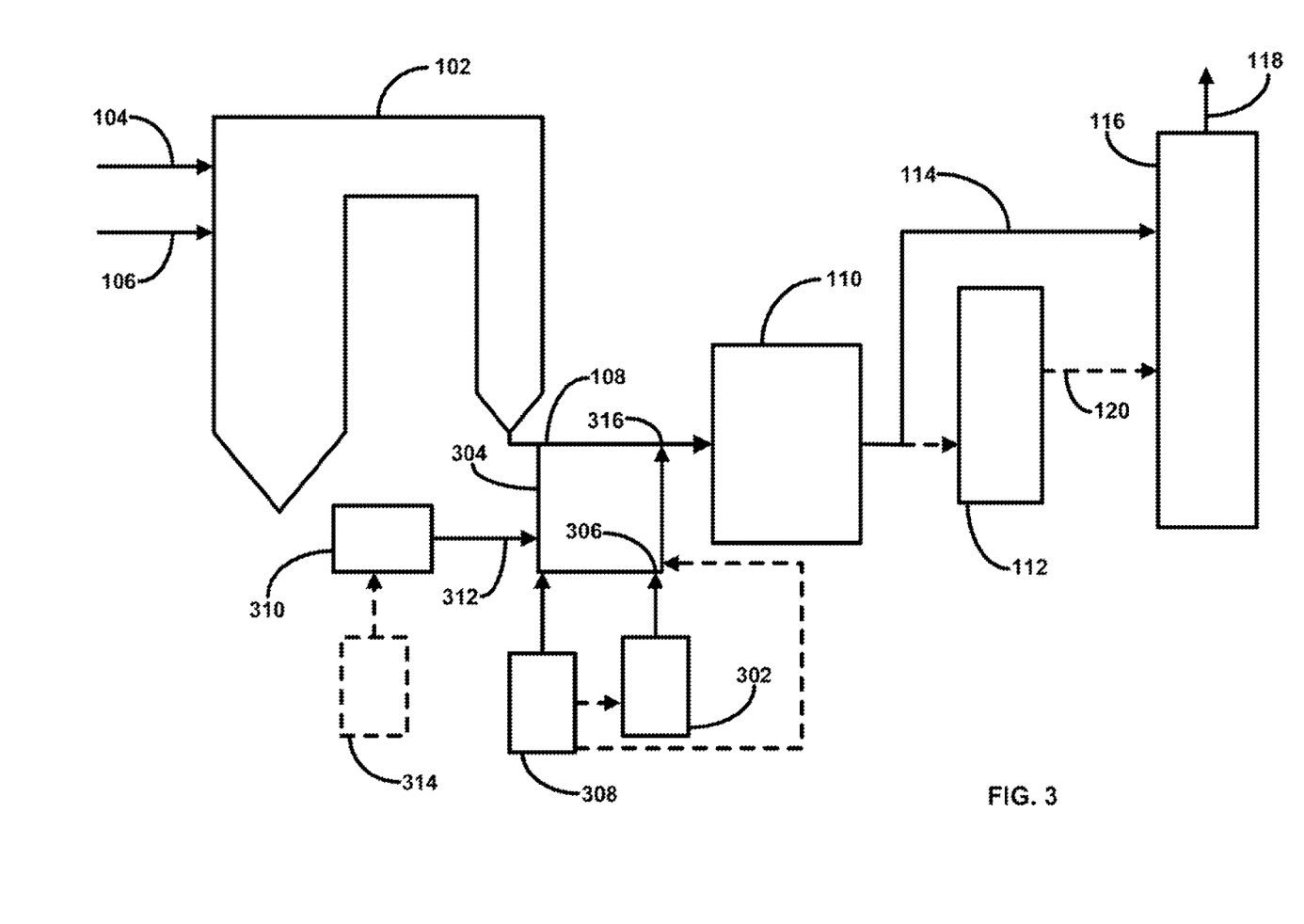
FIG. 3 illustrates a process flow diagram for generating a sorbent having an enhanced effectiveness in a slipstream of gas and adding it to a flue gas stream according to one embodiment of the invention.

FIG. 3 illustrates a process flow diagram for generating a sorbent having an enhanced effectiveness in a slipstream of gas and adding it to a flue gas stream according to one embodiment of the invention. This embodiment is illustrated using the same process flow diagram from FIG. 1. In this embodiment, the sorbent precursor, such as a raw carbonaceous material, is added by an addition device 302 to a slipstream 304 of flue gas at an addition location 306. The addition device 302 can be any mechanical or pneumatic device that feeds the raw carbonaceous material in either dry or slurry form at the desired addition location 306. Similar to FIG. 2, a chemical(s) used to enhance the activity of the activated sorbent produced from the sorbent precursor is added using a chemical addition device 308 to the slipstream 304 upstream of the addition location 306 for the sorbent precursor, to the sorbent precursor addition device 302 (as shown by the dotted line extending from the chemical addition device 308 to the second addition device 302) such that the chemical(s) is added concurrently with the sorbent precursor, or downstream of the addition location 306 for the sorbent precursor (as shown by the dotted line extending from the chemical addition device 308 to a location downstream of the addition location 306). As described in connection with FIG. 2, the chemical addition device 308 may be any device known in the art suitable for adding a given chemical compound to a desired location or piece of equipment. Further, any of the chemicals described in connection with FIG. 2 may be used in the embodiment shown in FIG. 3.

FIG. 3 also illustrates an activation gas generator 310 that produces an activating gas stream 312. The activating gas stream 312 is added anywhere along the slipstream 304 upstream of the addition location 306 for the sorbent precursor but upstream or downstream of the addition location for any chemical(s) added directly to the slipstream 304 by the chemical addition device 308. This activating gas stream 312 may be used to supplement the activating function of the flue gas in the slipstream 304. The activation gas generator 310 may, for example, be a source of steam or $CO_2$. Accordingly, a chemical addition device 314 may alternatively be used, alone or in combination with the chemical addition device 308 that adds the chemical(s) to the slipstream 304 or to the addition device 302, to add the chemical(s) to the activation gas generator 310 or to the activating gas stream 312.

In this embodiment, the sorbent precursor, such as a raw carbonaceous material, is activated in-situ by the heat of the slipstream 304, supplemented as necessary with the activating gas stream 312, and its activity is enhanced by the presence of, or reaction with, the chemical(s) added by either one of, or both of, the chemical addition devices 308, 314 that add the chemical(s) used to enhance the activity of the activated sorbent produced from the sorbent precursor. The chemically-enhanced activated sorbent is then added back to the flue gas at an addition location 316, noting that this location may be positioned anywhere along the combustion device outlet duct 108 downstream of the point where the slipstream is taken from the flue gas in the combustion device outlet duct 108 and upstream of the particulate collection device 110.

It should be appreciated that the same methods described above in connection with FIG. 2 for the addition of certain chemicals to the flue gas stream for purposes of reacting with a given gaseous pollutant can be applied to the process illustrated in FIG. 3. Accordingly, the same equipment described in connection with FIG. 3 for the addition of chemical(s) used to enhance the activity of an activated sorbent can be used to simply add chemicals to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and to chemically enhance an activated sorbent that is separately added to and present in the flue gas stream, may be implemented in the process described in connection with FIG. 3.

Figure 4:
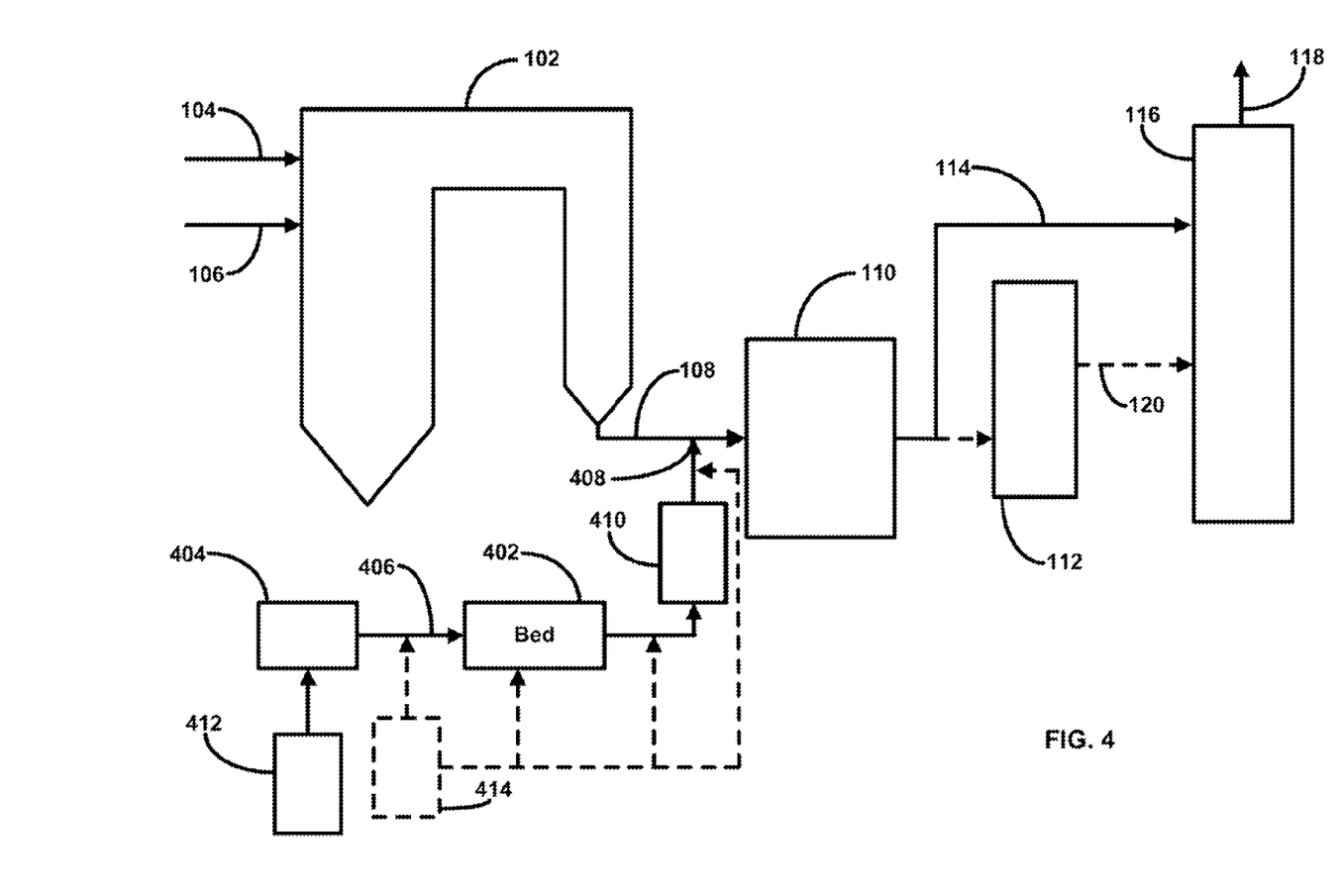
FIG. 4 illustrates a process flow diagram for adding a sorbent generated from a bed of raw carbonaceous material and having an enhanced effectiveness to a flue gas stream according to another embodiment of the invention.

FIG. 4 illustrates a process flow diagram for adding a sorbent generated from a bed of sorbent precursor and having an enhanced effectiveness to a flue gas stream according to another embodiment of the invention. This embodiment is illustrated using the same process flow diagram from FIG. 1. In this embodiment, a sorbent precursor, such as a raw carbonaceous material, is used in a bed 402 from which an activated sorbent is generated. A gas stream source 404 is used to provide an activating gas stream 406 that is provided, in this embodiment, to the bed 402 to activate the sorbent precursor in the bed 402, such as a fluidized or fixed bed. More specifically, the activating gas stream 406 is applied at a suitable temperature and for an appropriate residence time to activate the sorbent precursor in the bed 402, such as a suitable temperature to activate a raw carbonaceous material into an activated carbon.

The gas stream source 404 may be any source or device used to provide an activating gas stream suitable to activate the sorbent precursor in the bed 402. The gas stream source 404 may be a separate combustor that generates a gas stream, or it may be a waste heat stream that is generated in a separate process or separate location from the combustion device 102. The gas stream source 404 may also be a gas stream formed by the combination of different gases, for example, by the combination of cylinder gases, that allows for the generation of a particular gas composition and temperature suitable for activating the sorbent precursor. In this embodiment, it should be appreciated that it is the temperature of the activating gas stream 406 from the gas stream source 404 that must be sufficient to activate the sorbent precursor in the bed 402. Accordingly, it should be appreciated that the temperature of the activating gas stream 406 may be adjusted to provide the desired temperature or the desired amount of activation. In one embodiment, the gas stream 406 has an activation temperature between about 100° C. and about 1400° C. The exhaust from the bed 402 can be recycled to the combustion device 102.

As the activating gas stream 406 passes through the bed 402, the sorbent precursor is activated in-situ by the heat of the activating gas stream 406. In some embodiments, the bed 402 initially comprises a raw carbonaceous material that is an unactivated carbon in the form of any one or more of coal, wood, petroleum coke, biomass materials, sewage sludge, organic waste, and the like. The unactivated carbon forms an unactivated carbon bed, which is any accumulation of unactivated carbon positioned on a substrate. The gas stream 406 from the gas stream source 404 is passed through the bed 402, for example, by routing the gas stream underneath the bed 402, such that the gas stream passes through the bed 402.

The resulting activated sorbent can be withdrawn continuously from the bed 402 and added to the flue gas stream at an addition location 408 using an addition device 410, which can be any mechanical or pneumatic device that feeds the activated sorbent at the desired addition location 408. It should be appreciated that the activated sorbent can be added at any point along the combustion device outlet duct 108 and upstream of the particulate collection device 110. Fresh sorbent precursor is added to the bed 402 either continuously or batch-wise from a feeder (not shown).

Similar to FIG. 2, a certain chemical(s) can be added to the gas stream source 404 and subsequently passed to the bed 402 with the activating gas stream 406 to enhance the activity of the activated sorbent produced from the bed 402. In this case, a chemical addition device 412 is used to add the chemical(s) to the gas stream source 404 such that the raw carbonaceous material is activated and its activation is enhanced by the addition of the chemical(s) to produce a chemically-enhanced activated sorbent. As described in connection with FIG. 2, the chemical addition device 412 may be any device known in the art suitable for adding a given chemical compound to a desired location or piece of equipment. Further, any of the chemicals described in connection with FIG. 2 may be used in the embodiment shown in FIG. 4.

Alternatively, or in addition to the chemical addition device 412 that adds the chemical(s) to the gas stream source 404, as shown by the dotted lines, the chemical(s) can be added to the activating gas stream 406 produced by the gas stream source 404 using another chemical addition device 414. In this case, the chemical(s) can be added downstream of the gas stream source 404 but upstream of the bed 402, directly to the bed 402, downstream of the bed 402 but upstream of the addition device 410 that adds the activated sorbent to the flue gas stream, or downstream of that same addition device 410.

It should be appreciated that the same methods described above in connection with FIG. 2 for the addition of certain chemicals to the flue gas stream for purposes of reacting with a given gaseous pollutant can be applied to the process illustrated in FIG. 4. Accordingly, the same equipment described in connection with FIG. 4 for the addition of chemical(s) used to enhance the activity of an activated sorbent can be used to simply add chemicals, to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and chemically enhance an activated sorbent that is separately added to and present in the flue gas stream, may be implemented in the process described in connection with FIG. 4.

Figure 5:
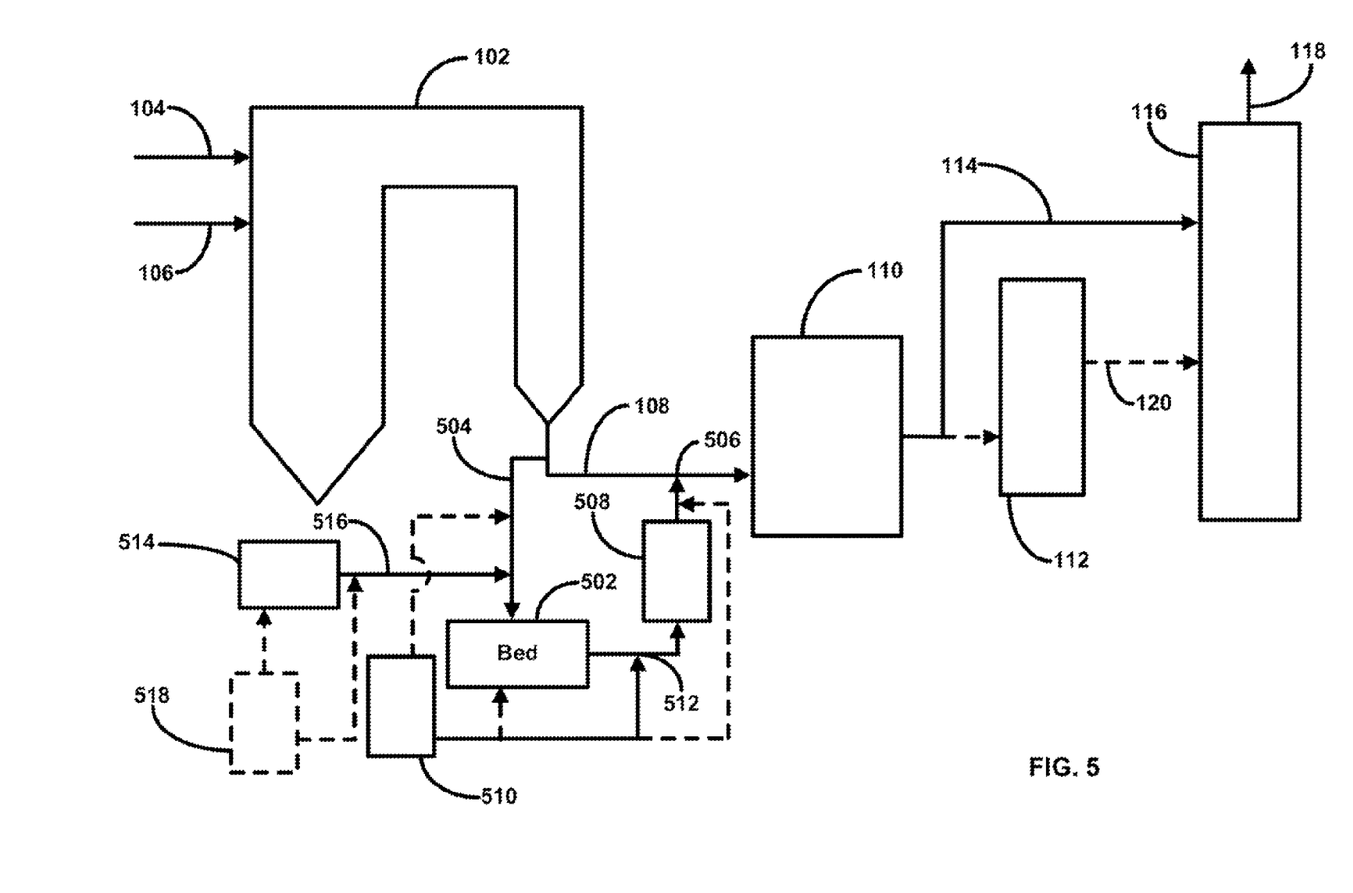
FIG. 5 illustrates a process flow diagram for adding a sorbent generated from a carbon bed and having an enhanced effectiveness to a slipstream of gas according to another embodiment of the invention.

FIG. 5 illustrates a process flow diagram for adding a sorbent generated from a carbon bed and having an enhanced effectiveness to a slipstream of gas according to another embodiment of the invention. This embodiment is illustrated using the same process flow diagram from FIG. 1. The process illustrated in FIG. 5 is similar to that of FIG. 3 in that a slipstream of flue gas is used and similar to that of FIG. 4 in that a bed of sorbent precursor is used to generate an activated sorbent having chemically-enhanced activity through the addition of a certain chemical(s) to the sorbent precursor or activated sorbent produced from the bed.

In this embodiment, similar to FIG. 4, a sorbent precursor, such as a raw carbonaceous material, is used in a bed 502 from which an activated sorbent is produced. A slipstream of flue gas 504 is taken from the combustion device outlet duct 108 and passed through the bed 502, such as a fluidized or fixed bed, to activate the sorbent precursor in the bed 502 in-situ by the heat of the slipstream 504. In some embodiments, the bed 502 initially comprises a raw carbonaceous material that is an unactivated carbon in the form of any one or more of coal, wood, petroleum coke, biomass materials, sewage sludge, organic waste, and the like. The unactivated carbon forms an unactivated carbon bed, which is any accumulation of unactivated carbon positioned on a substrate. The slipstream 504 is passed through the bed 502, for example, by routing the gas stream underneath the bed 502, such that the gas stream passes through the bed 502.

The resulting activated sorbent can be withdrawn continuously from the bed 502 and added to the flue gas stream at an addition location 506 using an addition device 508, which can be any mechanical or pneumatic device that feeds the activated sorbent at the desired addition location 506. It should be appreciated that the activated sorbent can be added at any point along the combustion device outlet duct 108 and upstream of the particulate collection device 110. Fresh sorbent precursor is added to the bed 502 either continuously or batch-wise from a feeder (not shown).

Similar to FIG. 2, a chemical(s) used to enhance the activity of the activated sorbent produced from the sorbent precursor is added using a chemical addition device 510 to the slipstream 504 downstream of the bed 502 or, in essence, to the addition device 508 at an addition point 512. Alternatively, or in addition, as shown by the dotted lines, the chemical addition device 510 may be used to add chemical(s) to the slipstream 504 upstream of the bed 502, directly to the bed 502, or downstream of the addition device 508 that is used to add the activated sorbent to the flue gas stream. As described in connection with FIG. 2, the chemical addition device 510 may be any device known in the art suitable for adding a given chemical compound to a desired location or piece of equipment. Further, any of the chemicals described in connection with FIG. 2 may be used in the embodiment shown in FIG. 5.

FIG. 5 also illustrates an activation gas generator 514 that produces an activating gas stream 516. The activating gas stream 516 can be added anywhere along the slipstream 504 upstream of the bed 502 or downstream of the bed 502 but upstream of the addition device 508 and as well as the addition point 512 for the chemical(s) (not shown). This activating gas stream 516 may be used to supplement the activating function of the flue gas in the slipstream 504. The activation gas generator 514 may, for example, be a source of steam or $CO_2$. Accordingly, a chemical addition device 518 may alternatively be used, alone or in combination with the chemical addition device 510 that adds the chemical(s) to the slipstream 504 or to the addition device 508, to add the chemical(s) to the activation gas generator 514 or to the activating gas stream 516.

In this embodiment, the sorbent precursor, such as a raw carbonaceous material, is activated in-situ by the heat of the slipstream 504, supplemented as necessary with the activating gas stream 516, and its activity is enhanced by the presence of, or reaction with, the chemical(s) added by either one of, or both of, the chemical addition devices 508, 518 that add the chemical(s) used to enhance the activity of the activated sorbent produced from the raw carbonaceous material. The chemically-enhanced activated sorbent is then added back to the flue gas at an addition location 506, noting that this location may be positioned anywhere along the combustion device outlet duct 108 downstream of the point where the slipstream is taken from the flue gas in the combustion device outlet duct 108 and upstream of the particulate collection device 110.

It should be appreciated that the same methods described above in connection with FIG. 2 for the addition of certain chemicals to the flue gas stream for purposes of reacting with a given gaseous pollutant can be applied to the process illustrated in FIG. 5. Accordingly, the same equipment described in connection with FIG. 5 for the addition of chemical(s) used to enhance the activity of an activated sorbent can be used to simply add chemicals to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and chemically enhance an activated sorbent that is separately added to and present in the flue gas stream, may be implemented in the process described in connection with FIG. 5.

It should be appreciated that the gas streams described above into which a sorbent precursor, such as a raw carbonaceous material, and chemicals are added to produce a chemically-enhanced activated sorbent (e.g., the gas stream generated by a gas stream source or the slipstream of flue gas) are contained within gas ductwork. Accordingly, the addition of the various components described above, such as the raw carbonaceous material and the chemical(s), basically react (e.g., activation of the raw carbonaceous material to activated carbon and reaction of the chemical with the activated carbon) within this gas ductwork. Accordingly, this gas ductwork can be viewed as a tubular reactor or high temperature reactor since the gas temperature can be adjusted to provide the necessary temperature and heat to activate and chemically-enhance the resulting product. However, it should be appreciated that other reactors known in the art could also be used.

Accordingly, the gas streams contained within this ductwork or reactor will have a temperature profile along the ductwork or reactor. Depending upon the composition of the sorbent precursor, such as a raw carbonaceous material, or the chemicals added to enhance the activation or effectiveness of the activated sorbent produced from such materials, the materials may need to be added at a specific addition location along the ductwork or reactor based upon the temperature profile. In other words, if a particular temperature is desired for activation of the raw carbonaceous material, then the addition location along the ductwork or reactor for that material should be selected so that the material is subjected to the desired temperature or range. Alternatively, the temperature of the gas in the ductwork or reactor can also be adjusted to provide the desired temperature range for a given addition location.

As noted, the foregoing descriptions of specific embodiments of the present invention are presented for purposes of illustration and description. They are not intended to be exhaustive or to limit the invention to the precise forms disclosed as many modifications and variations are possible in view of the above teachings. For example, the above embodiments are described in the context of a combustion device, such as a coal-fired boiler, and the resulting flue gas. However, the various embodiments of the invention are applicable to any gas stream from which a gaseous pollutant or vapor phase contaminant needs to be removed. Further, the above embodiments are described in the context of the addition of a raw carbonaceous material as the sorbent precursor to be activated. However, other materials that can be used as a sorbent precursor and activated, such as titania and alumina, may be particularly useful in conjunction with the addition of iron and various transition and noble metals as described above. Other materials include limestone and lime as described in U.S. patent application Ser. No. 12/722,497, filed Mar. 11, 2010, which is incorporated by reference herein in its entirety.

Further still, it should be appreciated that multiple chemicals can be added to enhance the activity or effectiveness of the material to be activated. In this case, such chemicals can be added at the same or different addition locations and can be added concurrently or sequentially. The composition of the chemical added can also vary and include other chemicals not expressly described herein that are known to enhance the effectiveness of a particular material as a sorbent. For example, such chemicals may include steam, carbon dioxide, air, and sulfur-containing additives such as elemental sulfur in powder or gaseous form, each of which may enhance the effectiveness of, for example, activated carbon. Further, various equipment configures can be used to add the chemicals to the activating gas stream.

In addition, various combinations of chemicals may be used and added to the gas stream containing the gaseous pollutant(s) to react with and convert the gaseous pollutant or multiple gaseous pollutants to forms that are more easily removed. Further, various equipment configures can be used to add the chemicals to the gas stream containing the gaseous pollutants.

What is claimed is:

1. A method for removing a gaseous pollutant, comprising:
   adding a sorbent precursor to an activating gas stream;
   adding a chemical to the activating gas stream separately from said adding of the sorbent precursor;
   activating the sorbent precursor in the presence of the chemical to produce a chemically-enhanced activated sorbent having enhanced adsorption capability that provides increased adsorption of a gaseous pollutant than the same activated sorbent produced in the absence of the chemical, wherein the presence of the chemical during said activating provides the enhanced adsorption capability;
   adding the chemically-enhanced activated sorbent to a gas stream comprising at least one gaseous pollutant;
   adsorbing the at least one gaseous pollutant with the chemically-enhanced activated sorbent, wherein the chemical reacts with the at least one gaseous pollutant; and
   removing the activated sorbent and the adsorbed gaseous pollutant from the gas stream;
   wherein said activating comprises contacting the sorbent precursor with an activating gas stream having a temperature sufficient to activate the sorbent precursor and wherein the activating gas stream comprises a slipstream of the gas stream comprising the at least one gaseous pollutant.

2. The method of claim 1, wherein the sorbent precursor comprises a raw carbonaceous material and the chemical comprises a bromide compound.

3. The method of claim 1, wherein the sorbent precursor comprises a raw carbonaceous material and the chemical comprises an iron compound.

4. The method of claim 1, wherein the sorbent precursor comprises a raw carbonaceous material and the chemical comprises a halogen or a halogen-based compound.

5. The method of claim 1, wherein the sorbent precursor comprises a raw carbonaceous material and the chemical comprises a transition metal or a transition metal-based compound.

6. The method of claim 1, wherein the sorbent precursor comprises a raw carbonaceous material and the chemical comprises an alkali.

7. The method of claim 6, wherein the alkali is selected from the group consisting of a sodium-based compound, a calcium-based compound, a magnesium-based compound, and combinations thereof.

8. The method of claim 1, further comprising:
converting the at least one gaseous pollutant or a second gaseous pollutant to a form that is more easily removed from the gas stream compared to the at least one gaseous pollutant's or the second gaseous pollutant's original form.

9. The method of claim 8, wherein the chemical is a halogen-based compound.

10. The method of claim 9, where the halogen-based compound is selected from the group consisting of a bromide salt, a chloride sale, an iodide salt, a fluoride salt, and combinations thereof.

11. A method for removing a gaseous pollutant, comprising:
providing a first gas stream comprising gaseous ions;
adding said first gas stream to a second gas stream comprising at least one gaseous pollutant;
converting the at least one gaseous pollutant to a converted form that is more easily removed from the gas stream compared to the at least one gaseous pollutant's original form;
adsorbing the converted form of the at least one gaseous pollutant with a sorbent; and
removing the sorbent and the converted form of at least one gaseous pollutant from the gas stream.

12. The method of claim 11, wherein said providing comprises generating said gaseous ions from a halogen-based compound.

13. The method of claim 12, where the halogen-based compound is selected from the group consisting of a bromide salt, a chloride sale, an iodide salt, a fluoride salt, and combinations thereof.

14. A method for removing a gaseous pollutant from a gas stream, comprising:

separately adding a sorbent precursor and a chemical concurrently to a first gas stream having a temperature sufficient to activate the sorbent precursor;
activating the sorbent precursor in the presence of the chemical to produce a chemically-enhanced activated sorbent in the first gas stream having enhanced adsorption capability that provides increased adsorption of a gaseous pollutant than the same activated sorbent produced in the absence of the chemical, wherein the presence of the chemical during said activating provides the enhanced adsorption capability;
adding the chemically-enhanced activated sorbent as it is produced from the first gas stream to a second gas stream comprising at least one gaseous pollutant;
adsorbing the at least one gaseous pollutant with the chemically-enhanced activated sorbent, wherein the chemical reacts with the at least one gaseous pollutant; and
removing the activated sorbent and the adsorbed gaseous pollutant from the gas stream;
wherein the first gas stream comprises a slipstream of the gas stream comprising the at least one gaseous pollutant.

15. The method of claim 14, wherein the sorbent precursor comprises a raw carbonaceous material and the chemical comprises a halogen-based compound.

16. The method of claim 14, further comprising:
converting the at least one gaseous pollutant or a second gaseous pollutant to a form that is more easily removed from the gas stream compared to the at least one gaseous pollutant's or the second gaseous pollutant's original form.

17. The method of claim 16, wherein the chemical is a halogen-based compound.

18. The method of claim 17, where the halogen-based compound is selected from the group consisting of a bromide salt, a chloride sale, an iodide salt, a fluoride salt, and combinations thereof.

* * * * *